United States Patent
Back et al.

[11] Patent Number: 5,836,699
[45] Date of Patent: Nov. 17, 1998

[54] ROLL-FORMED BUSHING FOR SLIDING SURFACE BEARINGS

[75] Inventors: Karl Back, Dielheim; Karl Becker, St. Leon-Rot; Wolfgang Bickle, Reilingen; Thomas Storch, Brühl, all of Germany

[73] Assignee: Kolbenschmidt Aktiengesellschaft, Neckarsulm, Germany

[21] Appl. No.: 534,359

[22] Filed: Sep. 27, 1995

[30] Foreign Application Priority Data

Sep. 30, 1994 [DE] Germany .............. 44 35 098.8

[51] Int. Cl.⁶ .................. F16C 33/10; F16C 35/02
[52] U.S. Cl. .................. 384/276; 384/283; 384/291; 384/295
[58] Field of Search .................. 384/276, 282, 384/286, 291, 292, 295, 296, 428, 439

[56] References Cited

U.S. PATENT DOCUMENTS

| | | | |
|---|---|---|---|
| 1,460,515 | 7/1923 | Selker | 384/276 |
| 1,731,790 | 10/1929 | Payne | 384/292 X |
| 2,905,511 | 9/1959 | Cerness | 384/295 X |
| 3,439,586 | 4/1969 | Holtan et al. | 384/276 X |
| 4,474,861 | 10/1984 | Ecer | 384/282 X |
| 4,655,615 | 4/1987 | Mori | 384/286 |
| 4,693,617 | 9/1987 | Roemer et al. | 384/282 |
| 5,319,851 | 6/1994 | Ikezawa et al. | 384/295 X |

FOREIGN PATENT DOCUMENTS

| | | |
|---|---|---|
| 0 158 024 | 10/1985 | European Pat. Off. . |
| A 1 310 614 | 10/1962 | France . |
| 179422 | 11/1982 | Japan .................. 384/276 |
| B 159473 | 5/1922 | United Kingdom . |
| 1 174 660 | 12/1969 | United Kingdom . |
| 2 138 514 | 10/1984 | United Kingdom . |
| 2 245 674 | 1/1992 | United Kingdom . |
| 93/22574 | 11/1993 | WIPO .................. 384/295 |

*Primary Examiner*—Thomas R. Hannon
*Attorney, Agent, or Firm*—Sprung Horn Kramer & Woods

[57] ABSTRACT

A roll-formed sliding surface bearing bushing is circular in an installed state and has a butt joint which extends throughout the width of the bushing and is closed in an installed state. To ensure a backlash-free bearing arrangement, the bushing has on its outside peripheral surface a trapezoidal profile, which includes an angle of 1° to 30° with the plane which contains the longitudinal axis of the bushing.

6 Claims, 4 Drawing Sheets

ROLL-FORMED BUSHING FOR SLIDING SURFACE BEARINGS

DESCRIPTION

This invention relates to a roll-formed bushing for sliding surface bearings, which bushing has been made from a strip section (sheet bar) comprising a maintenance-free or low-maintenance bearing material, and which busing is circular in an installed state and has an outside peripheral surface which has a profile that extends throughout the width of said peripheral surface.

In numerous sliding surface hearing arrangements, e.g., in motor vehicles, a perfect freedom of backlash throughout the service life of the sliding surface bearing arrangement is required.

Various types of bushings for sliding surface bearings are known for said purposes. For instance, DE-A-24 06 658 describes a resilient bearing bushing, which comprises a portion which has a smaller radius and is resiliently urged against the peripheral surface of the shaft and radially inwardly spaced from the inside periphery of the housing, and a portion which has a larger radius and is resiliently urged against the inside periphery of the housing and radially outwardly spaced from the peripheral surface of the shaft and said portions alternate in the peripheral direction. DE-A-23 47 548 describes a sliding surface bearing bushing, which is provided with plastic pads, which alternate in the peripheral direction on the outside surface and on the inside surface. WO 93/22574 discloses a sliding surface bearing bushing which in a non-clamped state has on its outside diameter and its inside diameter a shape that deviates from a circular shape. Said deviating polygonal shape is the result of a controlled shaping and of a roof shape adjacent to the butt joint. When said sliding surface baring bushing is pressed into a bearing housing it tends to be seized adjacent to the closed butt joint, particularly if the bearing housing consists of a light alloy. Another disadvantage resides in that in such a sliding surface bearing bushing when installed into the bearing housing the position of its butt joint must carefully be controlled and this increases the assembling costs. DE-A-39 22 052 describes a maintenance-free sliding surface bearing bushing for motor vehicle door hinges. At least that surface of the sliding surface bearing bushing which is associated with the hinge pin is provided with a profile which is constituted by parallel linear elevations and recesses, which are claimed to ensure extremely small bearing clearances. But a disadvantage resides in that the linear elevations on the inside diameter do not ensure the required freedom of backlash throughout the life of the sliding surface bearing bushing.

It is an object of the invention to provide for sliding surface bearings a roll-formed bushing which is of the type described first hereinbefore and which can be used to provide a backlash-free bearing arrangement in which a backlash between the bearing housing bore and the shaft or pin will be precluded throughout the life of the bearing arrangement.

That object is realized in accordance with the present invention which provides a roll-formed bushing for sliding surface bearings, which bushing is made from a strip section comprising a maintenance-free or low-maintenance bearing material and which is circular in an installed state, which bushing comprises a butt joint which extends throughout the width of the bushing and is closed in an installed state, and in which bushing at least the outside peripheral surface has a profile which extends throughout the width of said peripheral surface.

The bushing in one embodiment the inside has a trapezoidal or rectangular profile which has a regular pitch and includes an angle of 1° to 30° with a plane which contains the longitudinal axis of the bushing.

In another embodiment the profile consists of frustoconical elevations, which are arranged in parallel rows, which include an angle of 1° to 30° with the longitudinal axis of bushing.

Advantageously, the profile has a depth of 0.01 to 0.1 mm. The bushing includes elevations and recesses in its outside peripheral surface, the mean arc lengths of each elevation and of its recess (4) being equal. The arc length of the elevations at their crests amounts to 30° to 70° of the periphery of the outer peripheral surface.

The bushing may be flanged.

The invention will be further described with reference to the accompanying drawing, wherein.

Figure 1:
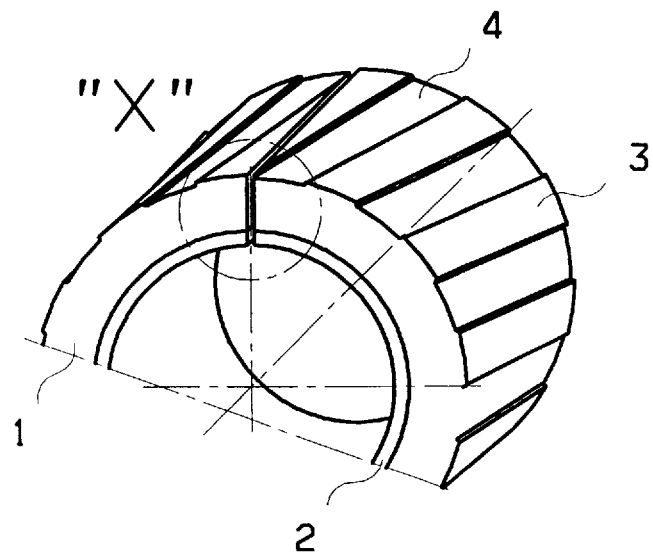
FIG. 1 is an isometric view of the one embodiment of a bushing in accordance with the present invention.

Referring now more specifically to the drawings:

FIG. 1 is an isometric showing of a roll-formed sliding surface bearing bushing which has a wall thickness of 1.0 mm and consists of a backing layer 1 of steel and a bearing layer 2 of a low-maintenance bearing material. The backing layer is provided on its outside peripheral surface with a trapezoidal profile that has a regular pitch and in which the mean arc lengths of an elevation 3 and of a recess 4 of the profile are equal. The trapezoidal profile includes an angle of 10° with the plane that contains the longitudinal axis of the sliding surface bearing bushing.

Figure 2:
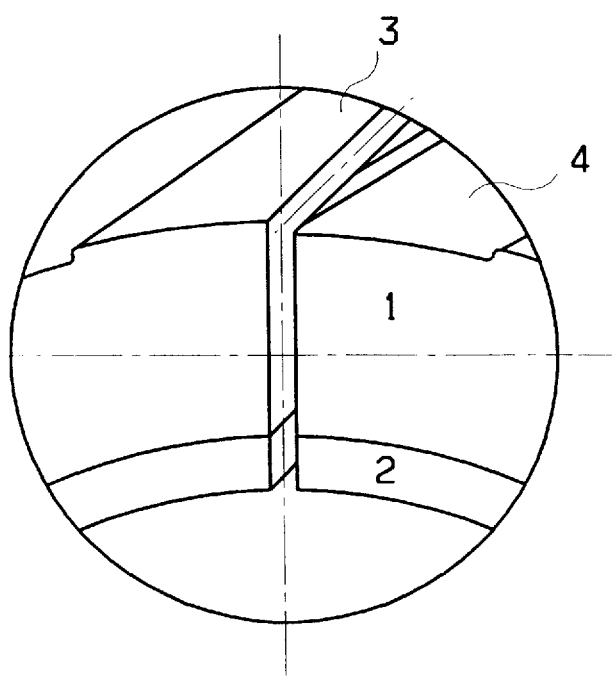
FIG. 2 is an enlarged view of a portion of FIG. 1.

FIG. 2 is an enlarged view showing the detail "X" in FIG. 1.

Figure 3:
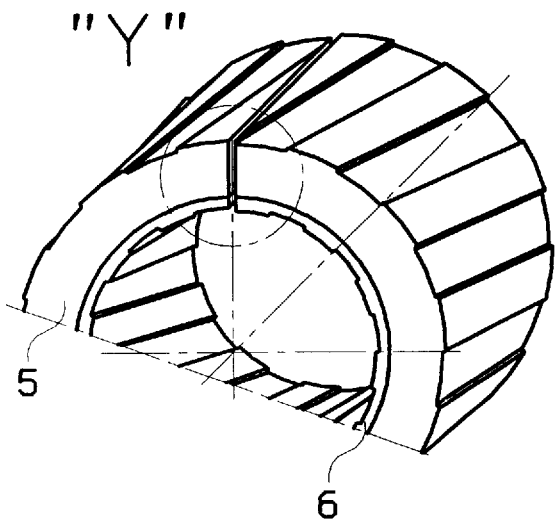
FIG. 3 is an isometric view of another embodiment of a bushing with a special inner profile.

FIG. 3 is an isometric showing of a roll-formed sliding surface bushing which has a wall thickness of 1.0 mm and consists of a backing layer 5 of steel and a bearing layer 6 of a maintenance-free bearing material. The backing layer 5 is provided on its outside peripheral surface and the bearing layer 6 is provided on its inside peripheral surface with a trapezoidal profile which has a regular pitch and includes an angle of 10% with the plane that contains the longitudinal axis of the sliding surface bearing bushing.

Figure 4:
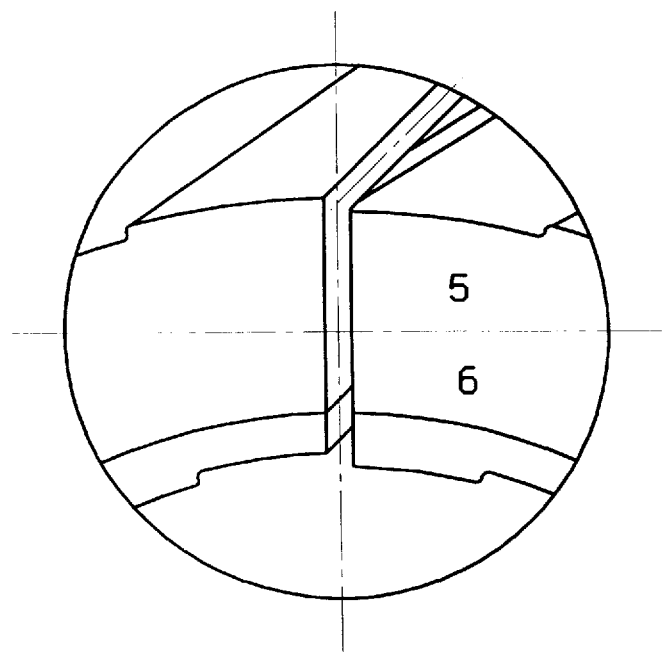
FIG. 4 is an enlarged view of a portion of FIG. 3.

FIG. 4 is an enlarged view showing the detail "Y" in FIG. 3.

Figure 5:
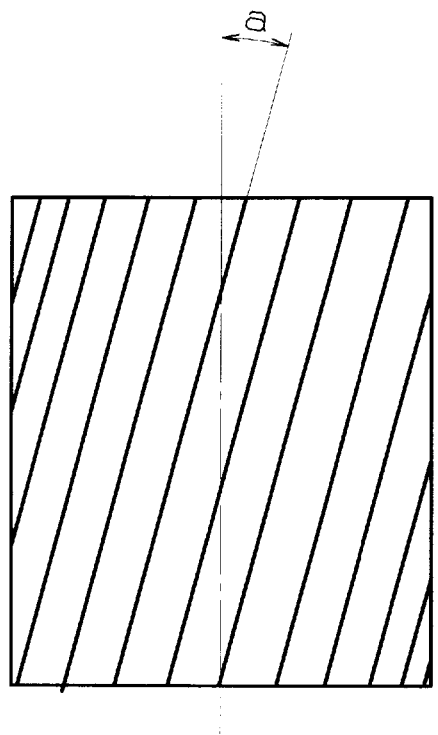
FIG. 5 is a plane view of a portion of the outer periphery of bushings of FIGS. 1 to 4.

FIG. 5 is a fragmentary view illustrating the profile provided on the outside peripheral surface of the sliding surface bearing bushing. The profile includes an angle of 16° with a plane that contains the longitudinal axis of the sliding surface bearing bushing.

Figure 6:
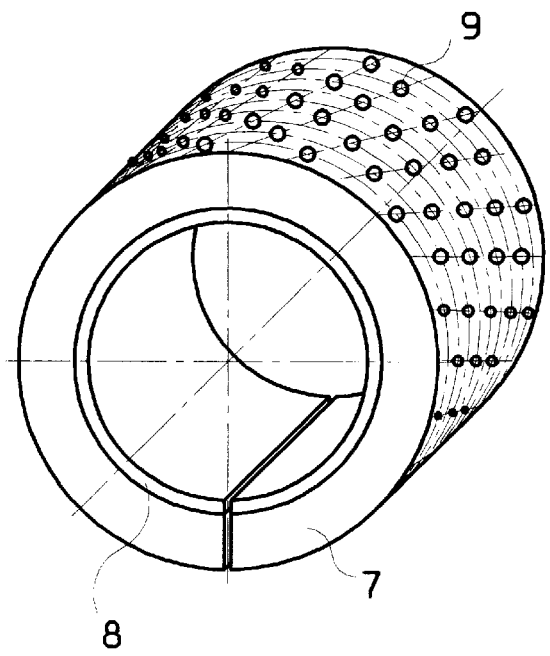
FIG. 6 is an isometric view of yet another embodiment of a bushing.

FIG. 6 is an isometric showing of a roll-formed sliding surface bearing bushing which has a wall thickness of 1.0 mm. A backing layer 7 of steel is provided with a bearing layer 8 of a maintenance-free bearing material. The backing layer 7 is provided on its outside peripheral surface with frustoconical elevations, which are arranged in parallel rows extending at an angle of 20% to a plane which contains the longitudinal axis of the sliding surface bearing bushing.

Figure 7:
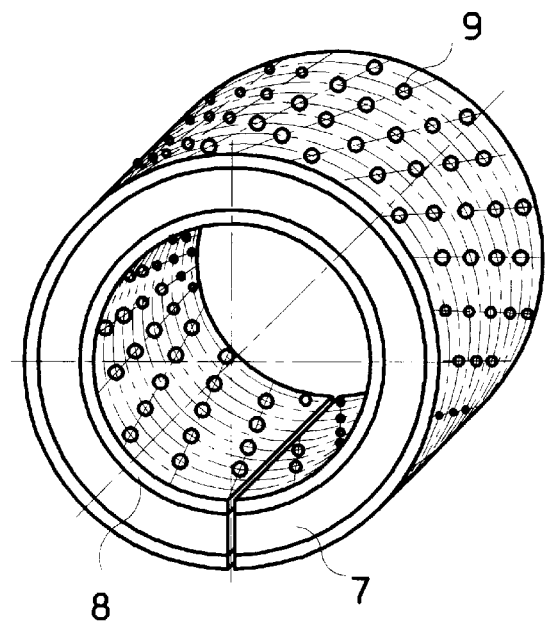
FIG. 7 is an isometric view of an embodiment of a bushing having frustoconical elevations on both the inside and outside peripheral surfaces.

FIG. 7 is an isometric view of a roll-formed sliding surface bearing bushing which is identical to that of FIG. 6, except that it is provided with frustoconical elevations on both its outside peripheral surface and its inside peripheral surface.

Figure 8:
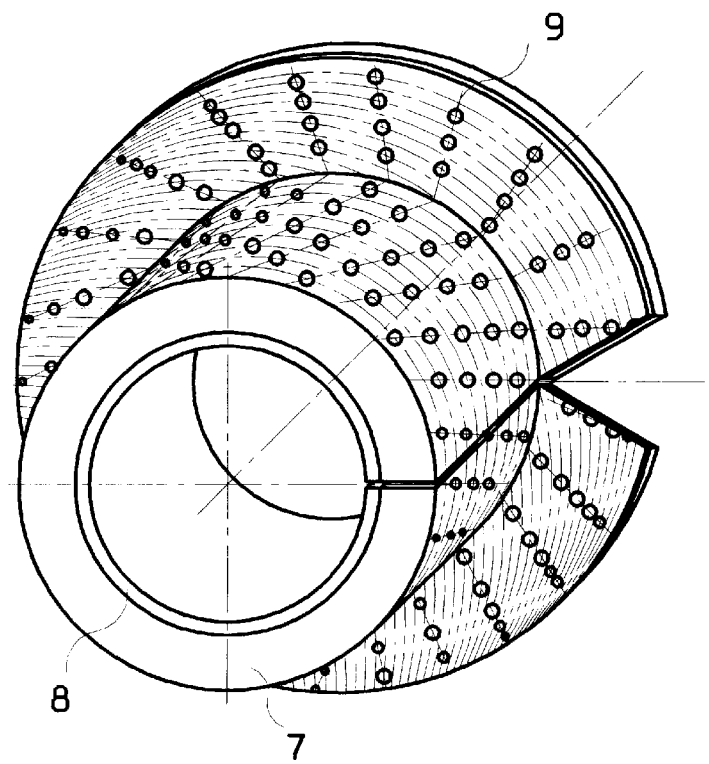
FIG. 8 is an isometric view of an embodiment of a flanged bushing.

FIG. 8 is an isometric view illustrating a bearing bushing of the invention which is provided with a flange.

The roll-formed bushings in accordance with the invention for sliding surface bearings may be made of all known materials for sliding surface bearings. Examples of such material are described in Technisches Handbuch, Kolbenschmidt AG, No. 15, 1989, on pages 3 to 11.

By the profile provided in accordance with the invention on the outside and/or inside peripheral surfaces of the roll-formed bushings for sliding surface bearings it is ensured that there will be an adequate support at the bearing housing and on the shaft or pin under all load conditions. A special advantage resides in that the butt joint of the bushing designed in accordance with the invention need not be pressed into the bearing housing in a predetermined position.

We claim:

1. A roll-formed bushing for sliding surface bearings, which bushing is made from a strip section comprising a maintenance-free or low-maintenance bearing material and which is circular in an installed state, which bushing comprises a butt joint which extends throughout the width of the bushing and is closed in an installed state, and in which bushing at least the outside peripheral surface has a profile which extends throughout the width of the said peripheral surface, characterized in that the profile consists of frustoconical elevations, which are arranged in parallel rows, which include an angle of 1° to 30° with the longitudinal axis of the bushing.

2. A roll-formed bushing according to claim 1, further characterized in that the inside peripheral surface is provided with frustoconical elevations, which are arranged in parallel rows, which include an angle of 1° to 30° with the longitudinal axis of the bushing.

3. A roll-formed bushing according to claim 1, further characterized in that the profile has a depth of 0.01 to 0.1 mm.

4. A roll-formed bushing according to claim 1, characterized in that the frustoconical elevations have elevations and recesses of equal mean arc lengths.

5. The roll-formed bushing of claim 1, wherein the arc length of said elevations at their crests amounts to 30 to 70% of the periphery of the outer peripheral surface.

6. A roll-formed bushing according to claim 1, further characterized in that it consists of a flanged bushing.

* * * * *